(12) United States Patent
Nishizawa et al.

(10) Patent No.: US 9,482,314 B2
(45) Date of Patent: Nov. 1, 2016

(54) BEARING ROLLER CHAIN

(71) Applicant: TSUBAKIMOTO CHAIN CO., Osaka (JP)

(72) Inventors: Yusuke Nishizawa, Osaka (JP); Takahisa Ando, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 198 days.

(21) Appl. No.: 14/476,829

(22) Filed: Sep. 4, 2014

(65) Prior Publication Data

US 2015/0080161 A1    Mar. 19, 2015

(30) Foreign Application Priority Data

Sep. 19, 2013 (JP) ................. 2013-194155

(51) Int. Cl.
*F16G 13/02* (2006.01)
*F16G 13/06* (2006.01)

(52) U.S. Cl.
CPC .................... *F16G 13/06* (2013.01)

(58) Field of Classification Search
CPC ........ F16G 13/06; F16C 19/26; F16C 21/00; F16C 33/34; B65G 17/38
USPC ........................................ 474/209
See application file for complete search history.

(56) References Cited

U.S. PATENT DOCUMENTS

| | | | | |
|---|---|---|---|---|
| 501,587 A * | 7/1893 | Gleason | .................. | F16G 13/06 213/156 |
| 569,632 A * | 10/1896 | Garrood | .................. | F16G 13/06 474/209 |
| 624,492 A * | 5/1899 | Hoffmann | .............. | F16G 13/06 474/209 |
| 2,428,060 A * | 9/1947 | Albrecht | .................. | B62M 9/10 474/209 |
| 3,278,000 A * | 10/1966 | l'Anson | .................. | B65G 17/38 198/850 |
| 4,729,754 A * | 3/1988 | Thuerman | .............. | F16G 13/06 474/207 |
| 4,795,408 A * | 1/1989 | Kotegawa | ............... | F16G 13/06 384/138 |
| 4,915,511 A * | 4/1990 | Kotegawa | .............. | B65G 17/38 384/127 |
| 5,077,965 A * | 1/1992 | Jedamzik | ............... | D06C 3/023 198/850 |
| 5,092,822 A * | 3/1992 | Wakabayashi | ............ | F16H 7/06 474/209 |
| 5,562,558 A * | 10/1996 | Kubota | .................. | B65G 17/38 474/209 |
| 6,070,711 A * | 6/2000 | Murano | .................. | B65G 17/38 198/712 |
| 6,102,573 A * | 8/2000 | Morimoto | ............... | F16C 21/00 384/127 |
| 6,321,523 B1 * | 11/2001 | Christmas | .............. | B65G 17/24 198/851 |
| 6,367,982 B1 * | 4/2002 | Doi | ........................ | F16C 19/40 384/463 |
| 6,685,588 B2 * | 2/2004 | Doi | ..................... | F16C 33/6696 384/907.1 |
| 6,782,687 B1 * | 8/2004 | Mingers | ................. | D06C 3/023 198/850 |
| 6,855,080 B2 * | 2/2005 | Kanehira | ................ | F16G 13/06 384/564 |

(Continued)

FOREIGN PATENT DOCUMENTS

| JP | 62-4122 A | 1/1981 |
|---|---|---|
| JP | 2002-235812 A | 8/2002 |
| JP | 2006046413 A | 2/2006 |

*Primary Examiner* — Henry Liu
(74) *Attorney, Agent, or Firm* — Nath, Goldberg & Meyer; Jerald L. Meyer

(57) ABSTRACT

A bearing roller chain includes a tubular bush configured to interconnect link plates facing each other, a tubular metal-made roller through which the bush is inserted, a plurality of metal-made anti-friction rollers arranged between an inner circumferential surface of the roller and an outer circumferential surface of the bush, and annular nonmetallic restraint members fitted into openings at the opposite ends of the roller in an axial direction, with the bush inserted through the restraint members, the restraint members configured to restrain axial direction movement of the plurality of anti-friction rollers.

3 Claims, 3 Drawing Sheets

(56) References Cited

U.S. PATENT DOCUMENTS

| | | | | |
|---|---|---|---|---|
| 7,972,233 B2* | 7/2011 | Fujiwara | | F16C 33/76 474/209 |
| 9,004,269 B2* | 4/2015 | Ueno | | B65G 17/38 198/779 |
| 2002/0110297 A1* | 8/2002 | Saji | | F16C 19/50 384/520 |
| 2002/0173392 A1* | 11/2002 | Doi | | F16C 33/6696 474/209 |
| 2003/0032511 A1* | 2/2003 | Kanehira | | F16G 13/06 474/209 |
| 2005/0023113 A1* | 2/2005 | Karnes | | F16G 13/07 198/851 |
| 2008/0234086 A1* | 9/2008 | Fujiwara | | F16C 33/34 474/209 |
| 2010/0248880 A1* | 9/2010 | Fujiwara | | F16C 33/34 474/209 |
| 2012/0181148 A1* | 7/2012 | Ueno | | B65G 17/38 198/500 |

* cited by examiner

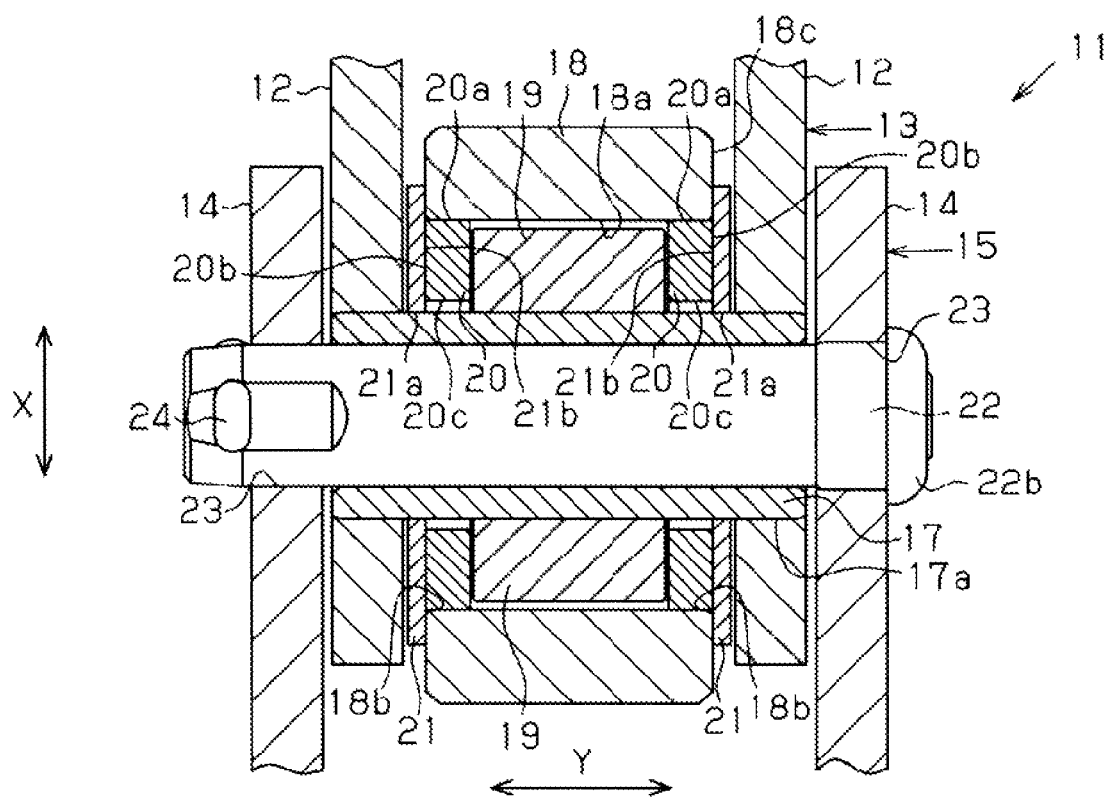

BEARING ROLLER CHAIN

CROSS-REFERENCE TO RELATED APPLICATION

This application claims the benefit of Japanese Patent Application No. 2013-194155, filed on Sep. 19, 2013, in the Japan Patent Office, the disclosure of which is incorporated herein in its entirety by reference.

TECHNICAL FIELD

The present disclosure relates to a bearing roller chain used in, e.g., conveying an article.

BACKGROUND

In the related art, there is known a bearing roller chain in which a plurality of anti-friction rollers is arranged between an outer circumferential surface of a cylindrical bush, which interconnects inner plates facing each other, and an inner circumferential surface of a cylindrical roller, into which the bush is inserted. In this bearing roller chain, flanges are integrally formed with the opposite end portions of the inner circumferential surface of the roller, thereby forming a recess that holds the anti-friction rollers. The roller is filled with a lubricant that lubricates the rotation of the anti-friction rollers.

In the bearing roller chain mentioned above, the roller, the flanges and the anti-friction rollers are usually made of metals. For that reason, during the use of the bearing roller chain, high frictional heat is generated due to the rotation of the anti-friction rollers, particularly due to the friction of the anti-friction rollers and the flanges, i.e., the friction of metals. In this case, however, when the temperature of the lubricant is increased by the frictional heat, the viscosity of the lubricant decreases and the lubricant within the roller tends to leak to the outside of the roller. As a result, there is posed a problem in that due to the leak, the lubricant for rotating the anti-friction rollers may become insufficient and the wear resistance decreases.

SUMMARY

In view of the problem inherent in the related art, the present disclosure provides a bearing roller chain capable of suppressing a reduction in the wear resistance.

According to one embodiment of the present disclosure, provided is a bearing roller chain, including a tubular bush configured to interconnect link plates facing each other, a tubular metal-made roller through which the bush is inserted, a plurality of metal-made anti-friction rollers arranged between an inner circumferential surface of the roller and an outer circumferential surface of the bush, and annular nonmetallic restraint members fitted into openings at the opposite ends of the roller in an axial direction, with the bush inserted through the restraint members, the restraint members being configured to restrain axial direction movement of the plurality of anti-friction rollers.

In this configuration, the restraint members are nonmetallic. Therefore, the frictional heat generated between the restraint members and the metal-made anti-friction rollers is suppressed to become lower than the frictional heat generated between metals. In general, lubricating grease is coated on the inner circumferential surface of the roller. Since the frictional heat generated between the restraint members and the anti-friction rollers is suppressed low, it is possible to suppress an increase in the temperature of the grease, thereby suppressing a reduction in the viscosity of the grease. Consequently, the grease is hardly leaked from the inside of the roller. It is therefore possible to suppress a reduction in the wear resistance.

In some embodiments, the bearing roller chain further includes annular shock absorbing members interposed between the restraint members and the link plates in the axial direction with the bush fitted into the shock absorbing members.

With this configuration, it is possible for the shock absorbing members to provide cushioning between the restraint members and the link plates. In some embodiments, the outer diameter of the shock absorbing members is larger than the inner diameter of the roller.

With this configuration, it is possible for the shock absorbing members to provide cushioning between the link plates and the restraint members and between the link plates and the roller. In some embodiments, the outer diameter of the shock absorbing members is smaller than the average of the outer diameter of the roller and the inner diameter of the roller.

With this configuration, when the bearing roller chain is used by arranging the same on, e.g., a groove-shaped rail, it is possible to restrain the shock absorbing members from making contact with the rail. In some embodiments, outer circumferential surfaces of the restraint members make close contact with the inner circumferential surface of the roller, inner circumferential surfaces of the shock absorbing members make close contact with the outer circumferential surface of the bush, and surfaces of the shock absorbing members facing the roller in the axial direction make contact with surfaces of the roller facing the shock absorbing members in the axial direction and surfaces of the restraint members facing the shock absorbing member in the axial direction.

With this configuration, when the grease existing within the roller is leaked to the outside, the grease sequentially passes through the clearances between the inner circumferential surfaces of the restraint members and the outer circumferential surface of the bush, the clearances between the shock absorbing members and the restraint members, and the clearances between the shock absorbing members and the roller. Accordingly, the route along which the grease existing within the roller is leaked to the outside becomes longer than the route along which the grease existing within the roller is leaked to the outside through the clearances between the outer circumferential surfaces of the restraint members and the inner circumferential surface of the roller or the clearances between the inner circumferential surfaces of the shock absorbing members and the outer circumferential surface of the bush. It is therefore possible to suppress the leakage to the outside of the grease existing within the roller.

According to the above embodiments of the present disclosure, it is possible to suppress a reduction in the wear resistance.

BRIEF DESCRIPTION OF THE DRAWINGS

FIG. 3 is a partial cross-sectional view schematically illustrating the bearing roller chain according to one embodiment of the present disclosure.

DETAILED DESCRIPTION

Figure 1:
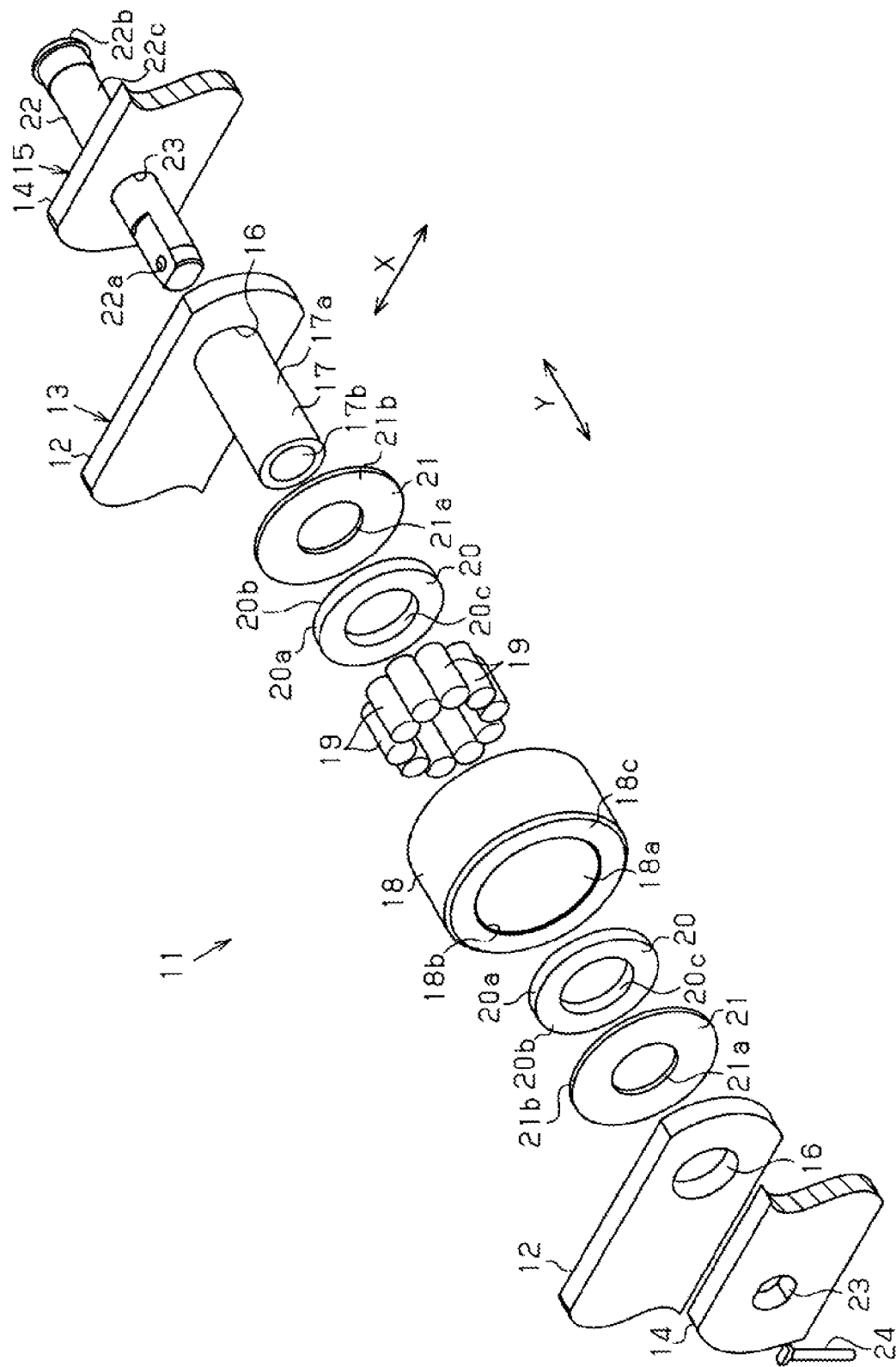
FIG. 1 is an exploded perspective view schematically illustrating some parts of a bearing roller chain according to one embodiment of the present disclosure.
Figure 2:
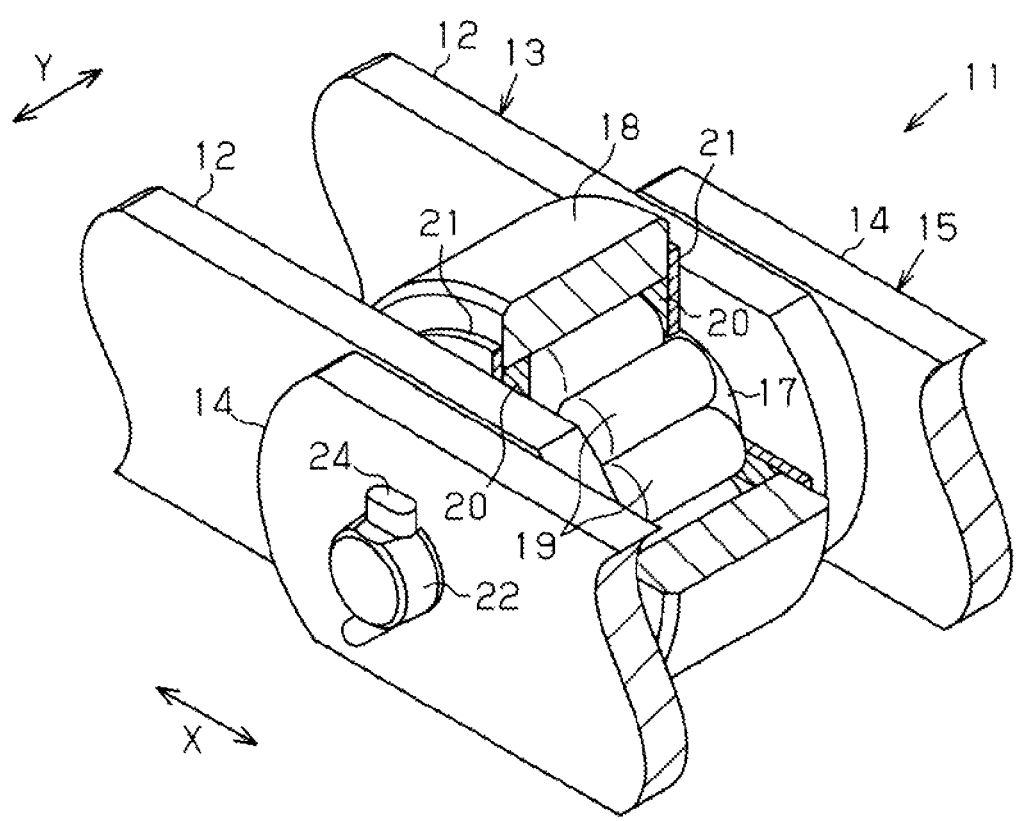
FIG. 2 is a partially cutaway perspective view schematically illustrating the bearing roller chain according to one embodiment of the present disclosure.

One embodiment of a bearing roller chain will now be described with reference to the accompanying drawings. As shown in FIGS. 1 and 2, a bearing roller chain 11 includes an inner link 13 composed of two metal-made link plates 12 facing each other in a width direction Y and an outer link 15 composed of two metal-made link plates 14 facing each other in the width direction Y.

The inner link 13 is a link in which the interval between two link plates 12 facing each other is narrower than the interval between two link plates 14 of the outer link 15. The outer link 15 is a link in which the interval between two link plates 14 facing each other is wider than the interval between two link plates 12 of the inner link 13. The bearing roller chain 11 is assembled into a predetermined length by alternately arranging the inner link 13 and the outer link 15 and rotatably interconnecting the end portions thereof mutually adjoining in a longitudinal direction X.

According to the present embodiment, the link plates 12 of the inner link 13 and the link plates 14 of the outer link 15 of the bearing roller chain 11 are formed into a rounded plate-like shape extending along the longitudinal direction X, namely the moving direction of the bearing roller chain 11 when it is pulled from one side in a lengthwise direction. The link plates 12 facing each other are arranged to become parallel to each other, and so are the link plates 14 facing each other.

Accordingly, the bearing roller chain 11 of the present embodiment may be referred to as a flat type chain configured such that the interval in the direction Y between the link plates 12 of the inner link 13 at one end portion of the link 13 in the direction X is set to be the same as the corresponding interval of the inner link 13 at the other end portion thereof, and so is the interval in the direction Y between the link plates 14 of the link 15.

Each of the link plates 12 includes two circular bush insertion holes 16 formed at both end portions of the link plate 12 in the longitudinal direction X, respectively. The circular bush insertion hole 16 is formed through the link plate 12 in the width direction Y, namely the thickness direction of the link plate 12. In the inner link 13, two metal-made bushes 17, each having a cylindrical shape, are assembled between two link plates 12 facing each other, so as to maintain the interval of the inner link 13 between the link plates 12.

The opposite end portions of each of the bushes 17 are respectively fitted into the bush insertion holes 16 of the respective link plates 12 so as to build a bridge between two link plates 12. The bush 17 is inserted into a metal-made roller 18 having a cylindrical shape. In this case, the axis of the roller 18 extends in the width direction Y. Therefore, the axial direction of the roller 18 in the present embodiment coincides with the width direction Y.

Lubricating grease is coated on the inner circumferential surface 18a of the roller 18. A plurality of (e.g., ten, in the present embodiment) metal-made anti-friction rollers 19 having a substantially cylindrical columnar shape is disposed between the inner circumferential surface 18a of the roller 18 and the outer circumferential surface 17a of the bush 17 such that the anti-friction rollers 19 are arranged side by side along the circumferential direction of the roller 18. Thus, the bush 17 rotatably supports the roller 18 through the respective anti-friction rollers 19.

As shown in FIGS. 1 and 3, annular nonmetallic restraint members 20 for restraining a movement in the width direction Y of the respective anti-friction rollers 19 are respectively fitted to openings 18b at the opposite ends of the roller 18 in the width direction Y. In this case, the bush 17 is inserted into the respective restraint members 20. The outer circumferential surface 20a of each of the restraint members 20 makes close contact with the inner circumferential surface 18a of the roller 18.

In this case, a small gap may be formed between the inner circumferential surface 20c of each of the restraint members 20 and the outer circumferential surface 17a of the bush 17. The outer side surfaces 20b in the width direction X of the respective restraint members 20 are respectively flush with the width direction side surfaces 18c of the roller 18. The restraint members 20 of the present embodiment are made of, e.g., polyamide which is one kind of synthetic resins and is superior in wear resistance.

Annular polyamide-made shock absorbing members 21 are respectively interposed between the respective restraint members 20 and the respective link plates 12 in the width direction Y so as to cover the respective openings 18b of the roller 18. In this case, the bush 17 is fitted to the respective shock absorbing members 21. The inner circumferential surfaces 21a of the respective shock absorbing members 21 make close contact with the outer circumferential surface 17a of the bush 17. The width direction inner side surfaces 21b of the respective shock absorbing members 21 make sliding contact with the respective side surfaces 18c of the roller 18 and the outer side surfaces 20b of the respective restraint members 20. Accordingly, the respective shock absorbing members 21 serve as positioning members that performs the positioning of the roller 18 in the width direction Y.

The thickness of the shock absorbing members 21 is smaller than the thickness of the restraint members 20. The outer diameter of the shock absorbing members 21 is set to be larger than the inner diameter of the roller 18 but smaller than the average of the outer diameter of the roller 18 and the inner diameter of the roller 18.

Each of the link plates 14 includes two pin insertion holes 23 at the opposite end portions of the link plate 14 in the longitudinal direction X, respectively. The pin insertion hole 23 is formed through the link plate 14 in the width direction Y, i.e., the thickness direction of the link plate 14. A cylindrical columnar pin 22 having an outer diameter smaller than the inner diameter of the bush 17 can be inserted into the pin insertion hole 23. A through-hole 22a extending in the direction orthogonal to both the longitudinal direction X and the width direction Y is formed in the tip end portion of the pin 22.

The link plates 14 of the outer link 15 are rotatably connected to the link plates 12 of the inner link 13 through the pin 22 at the outer side of the link plates 12 of the inner link 13 between which the bush 17 is assembled. In this case, the intermediate portion other than the opposite end portions of the pin 22 is inserted through the bush 17 assembled between the link plates 12 of the inner link 13. The opposite end portions of the pin 22 are fitted to the pin insertion holes 23 of the link plates 14 of the outer link 15.

In this case, an increased diameter portion 22b larger in diameter than the pin insertion holes 23 is formed in the base end portion of the pin 22. As shown in FIG. 2, a rod-like locking pin 24 longer than the diameter of the pin insertion holes 23 is inserted through the through-hole 22a of the tip end portion of the pin 22. In this state, a leading end of the locking pin 24 is bent. Accordingly, by the increased diameter portion 22b and the locking pin 24, the pin 22 is prevented from being removed from the pin insertion holes 23. A lubricant exists between the inner circumferential surface 17b of the bush 17 and the outer circumferential surface 22c of the pin 22.

Next, the operation of the bearing roller chain 11 will be described in detail. In one embodiment, the bearing roller chain 11 is used in conveying an article. For example, the bearing roller chain 11 is wound around a plurality of sprockets (not shown). In this state, the bearing roller chain 11 is used in such a way that the bearing roller chain 11 is caused to move around the sprockets.

When using the bearing roller chain 11 in this manner, the roller 18 and the restraint members 20 are rotated together, or the bush 17 and the shock absorbing members 21 are rotated together. If the roller 18 and the restraint members 20 are rotated together, the respective anti-friction rollers 19 rotate about the center axes thereof extending in the width direction Y. In this case, the anti-friction rollers 19 and the restraint members 20 are rubbed against each other, thereby generating frictional heat.

As described above, the respective anti-friction rollers 19 are made of a metal and the restraint members 20 are made of polyamide (synthetic resin). Therefore, as compared with a case where the restraint members 20 are made of a metal, it is possible to remarkably decrease the generation of frictional heat. This makes it possible to suppress an increase in the temperature of the lubricating grease that lubricates the respective anti-friction rollers 19 arranged inside the roller 18, consequently preventing a decrease in the viscosity of the lubricant. Also, such configuration would suppress the leakage of the lubricating grease from the inside of the roller 18 to the outside thereof, and maintain the lubricating state of the roller 18 and the respective anti-friction rollers 19. As a result, it is possible to suppress a reduction in the wear resistance of the roller 18 and the respective anti-friction rollers 19.

In the bearing roller chain 11 of the present embodiment, the outer circumferential surfaces 20a of the respective restraint members 20 make close contact with the inner circumferential surface 18a of the roller 18. The inner circumferential surfaces 21a of the respective shock absorbing members 21 make close contact with the outer circumferential surface 17a of the bush 17.

Therefore, if the lubricating grease existing within the roller 18 were to be leaked to the outside, the lubricating grease sequentially passes through clearances between the inner circumferential surfaces 20c of the respective restraint members 20 and the outer circumferential surface 17a of the bush 17, clearances between the inner side surfaces 21b of the respective shock absorbing members 21 and the outer side surfaces 20b of the respective restraint members 20, and clearances between the inner side surfaces 21b of the respective shock absorbing members 21 and the respective side surfaces 18c of the roller 18.

Accordingly, the route along which the lubricating grease in the roller 18 is leaked to the outside becomes longer than the route along which the lubricating grease in the roller 18 is leaked to the outside through the clearances between the outer circumferential surfaces 20a of the respective restraint members 20 and the inner circumferential surface 18a of the roller 18 or the clearances between the inner circumferential surfaces 21a of the respective shock absorbing members 21 and the outer circumferential surface 17a of the bush 17. Thus, the leakage of the lubricating grease in the roller 18 to the outside is suppressed.

Moreover, the above configuration may suppress foreign substances from entering the inside of the roller 18 from the outside. The foreign substances may enter the inside of the roller 18 in the same way as the lubricating grease in the roller 18 is leaked to the outside. As such, the foreign substances are hard to enter the inside of the roller 18 from the outside for the same reason as the leakage of the lubricating grease being suppressed.

According to the embodiment described above, the following effects may be provided.

(1) In the bearing roller chain 11, the restraint members 20 are made of polyamide (synthetic resin). Therefore, the frictional heat generated between the restraint members 20 and the metal-made anti-friction rollers 19 can be kept lower than the frictional heat generated between metals. For that reason, it is possible to suppress an increase in the temperature of the lubricating grease caused by the generation of the frictional heat within the roller 18. This makes it possible to suppress a decrease in the viscosity of the lubricating grease. Consequently, the lubricating grease is hardly leaked from the inside of the roller 18. It is therefore possible to suppress a reduction in the wear resistance of the roller 18 and the respective anti-friction rollers 19 caused by the insufficient lubrication of the lubricating grease.

(2) In the bearing roller chain 11, the shock absorbing members 21 are interposed between the restraint members 20 and the link plates 12 in the width direction Y with the bush 17 fitted to the shock absorbing members 21. It is therefore possible for the shock absorbing members 21 to provide cushioning between the restraint members 20 and the link plates 12.

(3) In the bearing roller chain 11, the outer diameter of the shock absorbing members 21 is larger than the inner diameter of the roller 18. It is therefore possible for the shock absorbing members 21 to provide cushioning between the link plates 12 and the restraint members 20 and between the link plates 12 and the roller 18.

(4) In the bearing roller chain 11, the outer diameter of the shock absorbing members 21 is smaller than the average of the outer diameter of the roller 18 and the inner diameter of the roller 18. For that reason, when the bearing roller chain 11 is used by arranging the same on a groove-shaped rail, it is possible to restrain the shock absorbing members 21 from making contact with the rail.

(5) In the bearing roller chain 11, the outer circumferential surfaces 20a of the respective restraint members 20 make close contact with the inner circumferential surface 18a of the roller 18. The inner circumferential surfaces 21a of the respective shock absorbing members 21 make close contact with the outer circumferential surface 17a of the bush 17. The width direction inner side surfaces 21b of the respective shock absorbing members 21 make sliding contact with the respective side surfaces 18c of the roller 18 and the outer side surfaces 20b of the respective restraint members 20. For that reason, if the lubricating grease in the roller 18 were to leak to the outside, the lubricating grease sequentially passes through the clearances between the inner circumferential surfaces 20c of the respective restraint members 20 and the outer circumferential surface 17a of the bush 17, the clearances between the inner side surfaces 21b of the respective shock absorbing members 21 and the outer side surfaces 20b of the respective restraint members 20, and the clearances between the inner side surfaces 21b of the respective shock absorbing members 21 and the respective side surfaces 18c of the roller 18. Accordingly, the route along which the lubricating grease in the roller 18 is leaked to the outside can be made longer than the route along which the lubricating grease in the roller 18 is leaked to the outside through the clearances between the outer circumferential surfaces 20a of the respective restraint members 20 and the inner circumferential surface 18a of the roller 18 or the clearances between the inner circumferential surfaces 21a of the respective shock absorbing members 21 and the outer circumferential surface 17a of the bush 17. Thus, it is possible to suppress the leakage of the lubricating grease in the roller 18 to the outside. In addition, the route along which foreign substances enter the inside of the roller 18 is the same as the route along which the lubricating grease in the roller 18 is leaked to the outside. As such, it is also possible to restrain foreign substances from entering the inside of the roller 18 from the outside.

(6) In the bearing roller chain 11, the roller 18 has a cylindrical shape. Therefore, as compared with a case where flanges are integrally formed with an inner circumferential surface of a roller as in the related art, it becomes quite easy to manufacture the roller 18. In addition, since the flanges employed in the related art do not exist on the inner circumferential surface 18a of the roller 18, it becomes extremely easy to perform a work of inserting the anti-friction rollers 19 into the roller 18 and assembling the anti-friction rollers 19.

Modified Examples

The embodiment described above may be modified as follows. The outer circumferential surfaces 20a of the respective restraint members 20 need not necessarily make close contact with the inner circumferential surface 18a of the roller 18.

The inner circumferential surfaces 21a of the respective shock absorbing members 21 need not necessarily make close contact with the outer circumferential surface 17a of the bush 17. The width direction inner side surfaces 21b of the respective shock absorbing members 21 need not necessarily make sliding contact with the respective side surfaces 18c of the roller 18 and the outer side surfaces 20b of the respective restraint members 20.

In the bearing roller chain 11, the outer diameter of the shock absorbing members 21 needs not be necessarily smaller than the average of the outer diameter of the roller 18 and the inner diameter of the roller 18. For example, the outer diameter of the shock absorbing members 21 may be larger than the outer diameter of the roller 18.

In the bearing roller chain 11, the outer diameter of the shock absorbing members 21 needs not be necessarily larger than the inner diameter of the roller 18. In the bearing roller chain 11, the shock absorbing members 21 may be omitted. In that case, the inner circumferential surfaces 20c of the respective restraint members 20 may be brought into sliding contact with the outer circumferential surface 17a of the bush 17. That is to say, the clearances between the inner circumferential surfaces 20c of the respective restraint members 20 and the outer circumferential surface 17a of the bush 17 may be removed.

The restraint members 20 may be made of a synthetic resin other than polyamide (e.g., polypropylene, polyethylene, etc.). The restraint members 20 may be made of ceramic, glass, wood or the like.

The thickness of the restraint members 20 may be changed to any suitable thickness. The bearing roller chain 11 may be a so-called offset type chain in which the links formed to have different width direction gaps at one longitudinal direction end and the other longitudinal direction end of the mutually-facing link plates are rotatably connected to one another along the longitudinal direction X.

According to a technical concept based on the embodiment and the modified examples described above, the restraint members are made of a synthetic resin.

This makes it possible to easily manufacture the restraint members by, e.g., injection molding or the like.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A bearing roller chain, comprising:
    a tubular bush configured to interconnect link plates facing each other;
    a tubular metal-made roller through which the bush is inserted;
    a plurality of metal-made anti-friction rollers arranged between an inner circumferential surface of the tubular metal-made roller and an outer circumferential surface of the bush;
    annular nonmetallic restraint members fitted into openings at the opposite ends of the tubular metal-made roller in an axial direction, with the bush inserted through the restraint members, the restraint members being configured to restrain axial direction movement of the plurality of metal-made anti-friction rollers; and
    annular shock absorbing members interposed between the restraint members and the link plates in the axial direction with the bush fitted into the shock absorbing members,
    wherein the outer diameter of the shock absorbing members is larger than the inner diameter of the tubular metal-made roller, wherein outer circumferential surfaces of the restraint members make close contact with the inner circumferential surface of the tubular metal-made roller,
    inner circumferential surfaces of the shock absorbing members make close contact with the outer circumferential surface of the bush, and
    surfaces of the shock absorbing members facing the tubular metal-made roller in the axial direction make contact with surfaces of the tubular metal-made roller facing the shock absorbing members in the axial direction and surfaces of the restraint members facing the shock absorbing member in the axial direction.

2. A bearing roller chain, comprising:
    a tubular bush configured to interconnect link plates facing each other;
    a tubular metal-made roller through which the bush is inserted;
    a plurality of metal-made anti-friction rollers arranged between an inner circumferential surface of the tubular metal-made roller and an outer circumferential surface of the bush;
    annular nonmetallic restraint members fitted into openings at the opposite ends of the tubular metal-made roller in an axial direction, with the bush inserted through the restraint members, the restraint members being configured to restrain axial direction movement of the plurality of metal-made anti-friction rollers; and annular shock absorbing members interposed between the restraint members and the link plates in the axial direction with the bush fitted into the shock absorbing members, wherein the outer diameter of the shock absorbing members is smaller than the average of the outer diameter of the tubular metal-made roller and the inner diameter of the tubular metal-made roller, wherein outer circumferential surfaces of the restraint members make close contact with the inner circumferential surface of the tubular metal-made roller, inner circumferential surfaces of the shock absorbing members make close contact with the outer circumferential surface of the bush, and surfaces of the shock absorbing members facing the tubular metal-made roller in the axial direction make contact with surfaces of the tubular metal-made roller facing the shock absorbing members in the axial direction and surfaces of the restraint members facing the shock absorbing member in the axial direction.

3. A bearing roller chain, comprising:

a tubular bush configured to interconnect link plates facing each other;

a tubular metal-made roller through which the bush is inserted;

a plurality of metal-made anti-friction rollers arranged between an inner circumferential surface of the tubular metal-made roller and an outer circumferential surface of the bush;

annular nonmetallic restraint members fitted into openings at the opposite ends of the tubular metal-made roller in an axial direction, with the bush inserted through the restraint members, the restraint members being configured to restrain axial direction movement of the plurality of metal-made anti-friction rollers; and annular shock absorbing members interposed between the restraint members and the link plates in the axial direction with the bush fitted into the shock absorbing members, wherein the outer diameter of the shock absorbing members is larger than the inner diameter of the tubular metal-made roller, wherein the outer diameter of the shock absorbing members is smaller than the average of the outer diameter of the tubular metal-made roller and the inner diameter of the tubular metal-made roller, wherein outer circumferential surfaces of the restraint members make close contact with the inner circumferential surface of the tubular metal-made roller, inner circumferential surfaces of the shock absorbing members make close contact with the outer circumferential surface of the bush, and surfaces of the shock absorbing members facing the tubular metal-made roller in the axial direction make contact with surfaces of the tubular metal-made roller facing the shock absorbing members in the axial direction and surfaces of the restraint members facing the shock absorbing member in the axial direction.

* * * * *